United States Patent
Peng

(10) Patent No.: US 6,661,612 B1
(45) Date of Patent: Dec. 9, 2003

(54) AIR BEARING SLIDER INCLUDING SIDE RAIL SHALLOW RECESSED SURFACES EXTENDING ALONG TRAILING PORTIONS OF LEADING SIDE AIR BEARING SURFACES

(75) Inventor: Jih-Ping Peng, Cupertino, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 112 days.

(21) Appl. No.: 10/035,762

(22) Filed: Oct. 21, 2001

(51) Int. Cl.[7] ............................ G11B 5/60; G11B 21/21
(52) U.S. Cl. ................. 360/236.3; 360/235.8; 360/236.1; 360/236.6; 360/236.8; 360/237
(58) Field of Search ................ 360/234–237, 360/237.1

(56) References Cited

U.S. PATENT DOCUMENTS

| | | | |
|---|---|---|---|
| 5,097,370 A | * | 3/1992 | Hsia |
| 5,309,303 A | * | 5/1994 | Hsia et al. |
| 5,777,825 A | | 7/1998 | Dorius |
| 6,144,528 A | * | 11/2000 | Anaya-Dufresne et al. ...... 360/235.4 |
| 6,445,542 B1 | * | 9/2002 | Levi et al. ................. 360/236.5 |
| 2002/0001157 A1 | * | 1/2002 | Kang et al. ............... 360/236.3 |

* cited by examiner

*Primary Examiner*—Craig A. Renner
(74) *Attorney, Agent, or Firm*—Won Tae C. Kim, Esq.; Milad G. Shara, Esq.; Stetina Brunda Garred & Brucker

(57) ABSTRACT

An air bearing slider for use in a disk drive. The slider includes a leading side and an opposing trailing side. The slider further includes a pair of leading side air bearing surfaces disposed adjacent the leading side. Each of the leading side air bearing surfaces includes a main portion and a trailing portion extending from the main portion toward the trailing side. The slider further includes a pair of side rails. Each of the side rails is disposed between a respective one of the leading side air bearing surfaces and the trailing side. Each of the side rails includes a side rail air bearing surface disposed toward the trailing side and a side rail shallow recessed surface extending away from the side rail air bearing surface toward the respective main portion and laterally along the respective trailing portion in spaced relation to the respective trailing portion.

13 Claims, 3 Drawing Sheets

AIR BEARING SLIDER INCLUDING SIDE RAIL SHALLOW RECESSED SURFACES EXTENDING ALONG TRAILING PORTIONS OF LEADING SIDE AIR BEARING SURFACES

CROSS-REFERENCE TO RELATED APPLICATIONS

Not applicable.

BACKGROUND OF THE INVENTION

1. Field of the Invention

The present invention relates generally to disk drives, and in particular to an air bearing slider which includes side rail shallow recessed surfaces extending along trailing portions of leading side air bearing surfaces.

2. Description of the Prior Art

The typical hard disk drive includes a head disk assembly (HDA) and a printed circuit board assembly (PCBA) attached to a disk drive base of the HDA. The head disk assembly includes the disk drive base, a cover, at least one magnetic disk, a spindle motor for rotating the disk, and a head stack assembly (HSA).

The spindle motor includes a spindle motor hub that is rotatably attached to the disk drive base. The spindle motor hub has an outer hub flange that supports a lowermost one of the disks. Additional disks may be stacked and separated with annular disk spacers that are disposed about the spindle motor hub. The head stack assembly has an actuator assembly having at least one air bearing slider or head, typically several, for reading and writing data to and from the disk. Each air bearing slider includes a magnetic transducer. An example of a slider is disclosed in U.S. Pat. No. 5,777,825 (incorporated herein by reference) that describes a slider where a center pad disposed at a trailing side contains a transducer. The printed circuit board assembly includes a servo control system in the form of a disk controller for generating servo control signals. The head stack assembly is controllably positioned in response to the generated servo control signals from the disk controller. In so doing, the attached sliders are moved relative to tracks disposed upon the disk.

The head stack assembly includes the actuator assembly, at least one head gimbal assembly (HGA), and a flex circuit cable assembly that are attached to the actuator assembly. A conventional "rotary" or "swing-type" actuator assembly typically comprises an actuator body, a pivot bearing cartridge, a coil portion that extends from one side of the actuator body to interact with one or more permanent magnets to form a voice coil motor, and one or more actuator arms which that extend from an opposite side of the actuator body. The actuator body includes a bore and the pivot bearing cartridge engaged within the bore for allowing the actuator body to rotate between limited positions. At least one head gimbal assembly is distally attached to each of the actuator arms. A head gimbal assembly includes an air bearing slider that is attached to a suspension with a gimbal. The head gimbal assemblies and the flex circuit cable assembly are attached to the actuator assembly. The actuator assembly is controllably rotated so as to move the heads relative to the disks for reading and writing operations with respect to the tracks contained on the disks.

A typical slider design includes leading and trailing sides. A center pad that includes an air bearing surface is disposed adjacent the trailing edge. A transducer is embedded within the center pad. At least one additional air bearing surface disposed upon a pad is provided adjacent the leading side. In this regard, a single air bearing surface may be provided which extends the width of the slider. Alternatively, a pair of air bearing surfaces may be provided at opposite lateral sides of the slider adjacent the leading edge. In addition, a depressed region or cavity is centrally disposed between the center pad and the leading side air bearing surfaces.

A problem that arises with such prior art slider designs is that debris in the form of particulate matter and dense fluids, such as lubricants, may tend to accumulate at the downstream side of the leading side air bearing surfaces. This is because the cavity being downstream of such air bearing surfaces promotes a vacuum effect with air expanding within such region. The accumulated debris negatively impacts the aerodynamic characteristics of the slider because the debris results in a change of the geometry of the slider. In addition, after accumulating, a portion of the debris may become dislodged. In this regard, the accumulation and dislodgement of the debris may be non-symmetrical with respect to the slider further negatively impacting the aerodynamic characteristics of the slider. Moreover, dislodged debris may become attached to the downstream center pad further exasperating the impact to aerodynamic characteristics of the slider. Such changes to the aerodynamic characteristics negatively impact the ability to maintain the slider at the prescribed flying height and introduce instability with regard to pitch and roll control. Accordingly, there is a need in the art for an improved disk drive in comparison to the prior art.

SUMMARY OF THE INVENTION

An aspect of the presenting invention can be regarded as the air bearing slider for use in a disk drive. The slider includes a leading side and an opposing trailing side. The slider further includes a pair of leading side air bearing surfaces disposed adjacent the leading side. Each of the leading side air bearing surfaces includes a main portion and a trailing portion extending from the main portion toward the trailing side. The slider further includes a pair of side rails. Each of the side rails is disposed between a respective one of the leading side air bearing surfaces and the trailing side. Each of the side rails includes a side rail air bearing surface disposed toward the trailing side and a side rail shallow recessed surface extending away from the side rail air bearing surface toward the respective main portion and laterally along the respective trailing portion in spaced relation to the respective trailing portion.

According to various embodiments, the side rail shallow recessed surfaces may be disposed laterally between the trailing portions. The trailing portions may be tapered toward trailing side. The side rail shallow recessed surfaces may be tapered toward the leading side. The slider may further include a deep recessed surface disposed between the leading and trailing sides. The deep recessed surface may extend laterally between the side rails. The deep recessed surface may further extend longitudinally between the main portions and the trailing side. The deep recessed surface may further extend laterally between the main portions. The deep recessed surface may further extend between each respective side rail shallow recessed surface and the associated trailing portion. The slider may further include a leading side shallow recessed surface disposed adjacent the leading side and extending between the leading side air bearing surfaces. The slider may further include a trailing side pad including a transducer disposed adjacent the trailing side. The trailing side pad may include a trailing side air bearing surface disposed adjacent the trailing side. The trailing side pad may include a trailing side shallow recessed surface extending towards the leading side from the trailing side air bearing surface.

DESCRIPTION OF THE PREFERRED EMBODIMENTS

Figure 1:
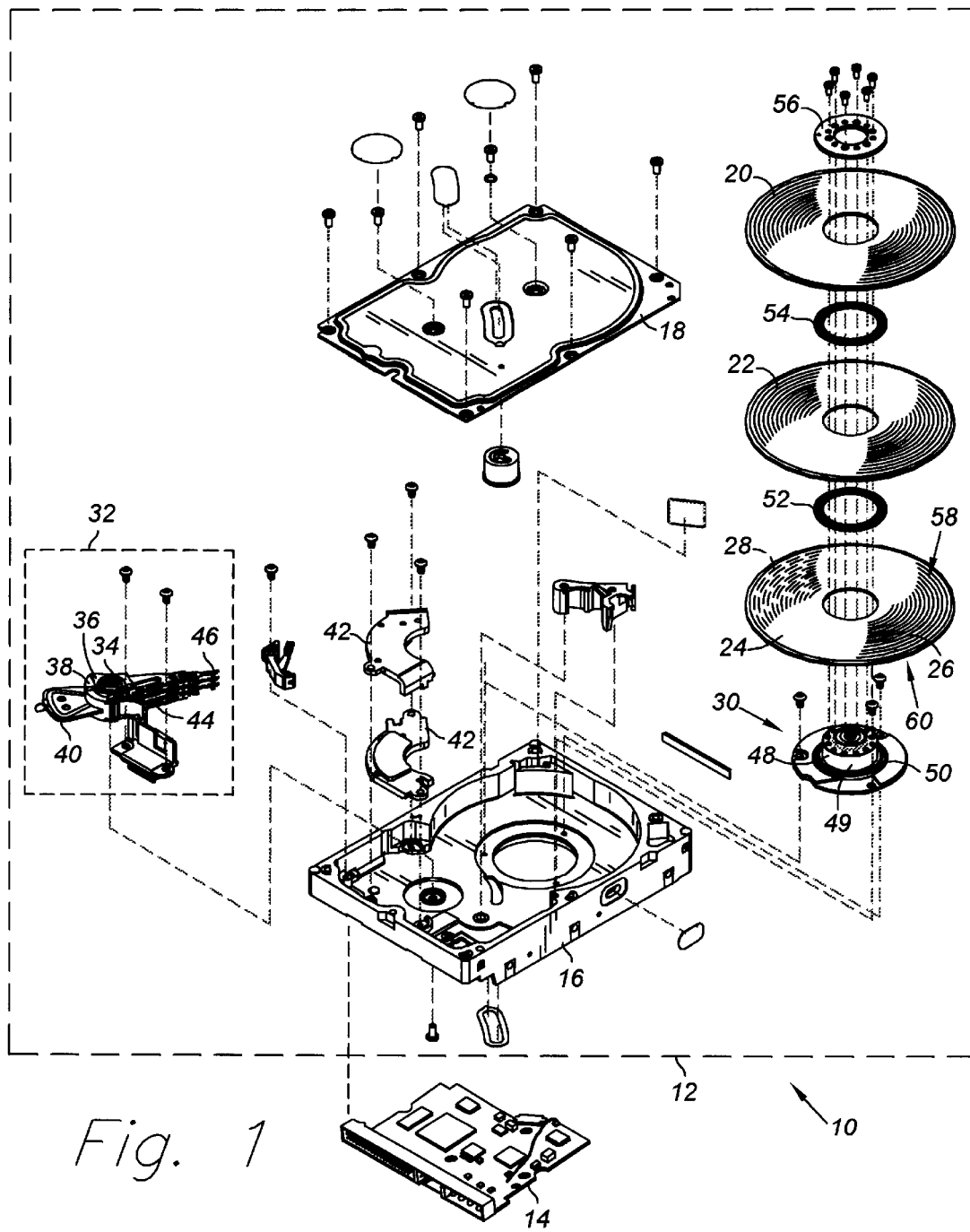
FIG. 1 is an exploded perspective view of a disk drive including air bearing sliders as constructed in accordance with the present invention.

Referring now to the drawings wherein the showings are for purposes of illustrating preferred embodiments of the present invention only, and not for purposes of limiting the same, FIGS. 1–5 illustrate a disk drive including an air bearing slider in accordance with the aspects of the present invention.

Referring now to FIG. 1 there is depicted an exploded perspective view of a disk drive 10 constructed in accordance with an aspect of the present invention. In the embodiment shown, the disk drive 10 includes a head disk assembly (HDA) 12 and a printed circuit board assembly (PCBA) 14. The head disk assembly 12 includes a disk drive base 16 and a cover 18 that collectively house magnetic disks 20, 22, 24. Each magnetic disk 20, 22, 24 contains a plurality of tracks for storing data. The magnetic disks 20, 22, 24 may be two-sided, and thus for example, the magnetic disk 24 is shown having a track 26 on an upper facing side 58 and a track 28 (shown in phantom) on a lower facing side 60. The head disk assembly 12 further includes a spindle motor 30 for rotating the magnetic disks 20, 22, 24. The head disk assembly 12 further includes a head stack assembly 32 and a pivot bearing cartridge 34. The head stack assembly 32 includes a rotary actuator 36.

The rotary actuator 36 includes an actuator body 38 that has a bore and the pivot bearing cartridge 34 engaged within the bore for facilitating the rotary actuator 36 to rotate between limited positions. The rotary actuator 36 further includes a coil portion 40 that extends from one side of the actuator body 38 to interact with a pair of permanent magnets 42 to form a voice coil motor for pivoting the rotary actuator 36. A plurality of actuator arms, the lowermost one of which being denoted 44, extend from an opposite side of the actuator body 38. As the disks 20, 22, 24 may be two sided, each of the actuator arms include either one or two head gimbal assemblies associated with the adjacent sides of the disks 20, 22, 24. Each head gimbal assembly includes a head (the uppermost one being denoted 46) for reading and writing data to and from the disks 20, 22, 24.

The spindle motor 30 includes a spindle motor hub 48 that is rotatably attached to the disk drive base 16. The spindle motor hub 48 has a hub body 49 and a hub flange 50 that extends from the hub body 49. The hub flange 50 includes a supporting surface for supporting a lowermost one of the disks, namely disk 24. The remaining disks 22, 20 are stacked and separated with annular disk spacers 52, 54 that are disposed about the hub body 49. The disk spacer 54 includes an upper side 60 and an opposing lower side 62, and the disk spacer 52 includes an upper side 64 and an opposing lower side 68. A disk clamp 56 is attached about the spindle motor hub 48 and is utilized to apply a clamping force against the topmost disk 20 for securing all the disks 20, 22, 24 to the spindle motor hub 48.

Figure 2:
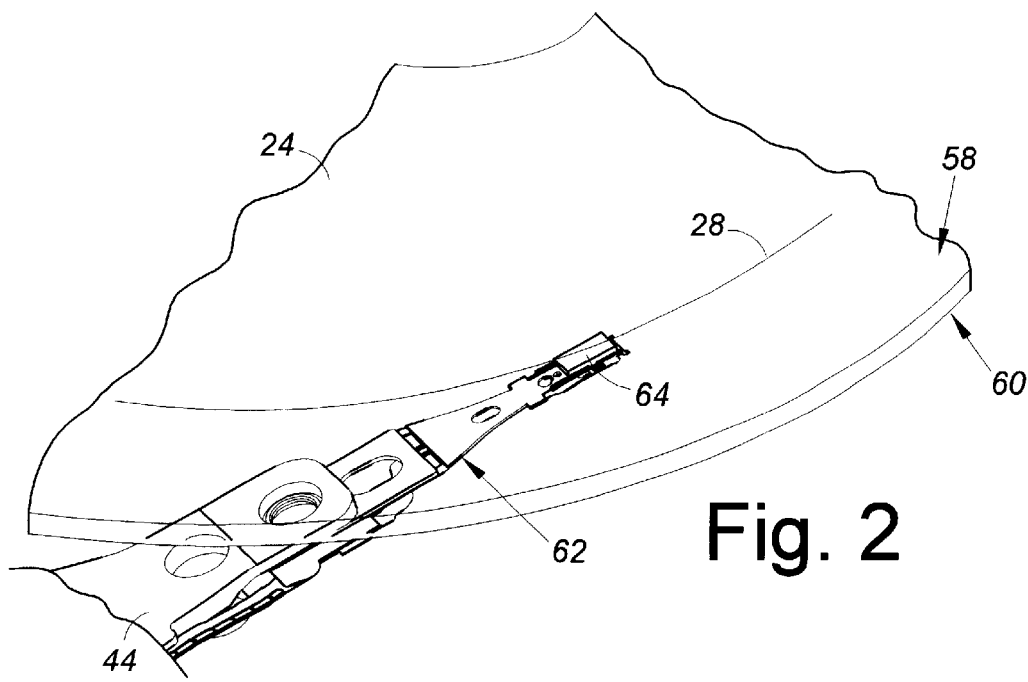
FIG. 2 is an enlarged view of a portion of a magnetic disk shown with a portion of a head gimbal assembly including an air bearing slider as constructed in accordance with the present invention.
Figure 3:
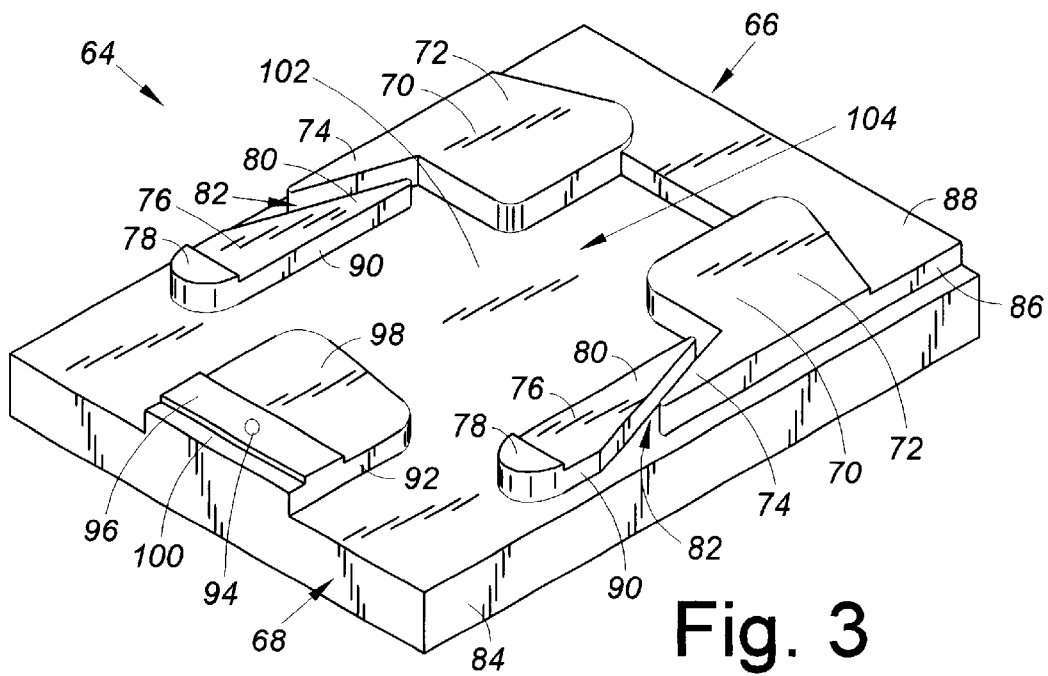
FIG. 3 is a perspective view of the air bearing slider of FIG. 2.
Figure 4:
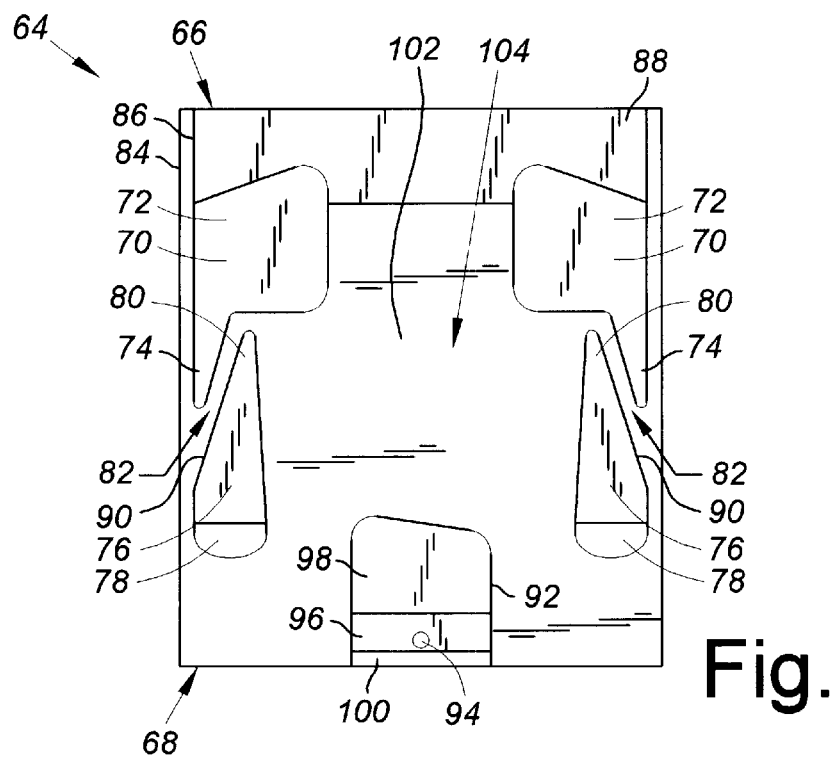
FIG. 4 is a plan view of the air bearing slider.

Referring now to FIG. 2, there is depicted the distal end of the actuator arm 44 shown with a portion of the disk 24. Each of the head gimbal assemblies includes a suspension 62. An air bearing slider or slider 64 of an embodiment of the present invention is attached to the suspension 62 via a gimbal (not shown). FIG. 3 is an enlarged perspective view of the air bearing slider of 64 of FIG. 2. FIG. 4 is a top plan view of the air bearing slider 64 of FIGS. 2 and 3. As will be discussed in detail below, the air bearing slider 64 is configured to fly above the lower facing side 60 of the disk 24 for reading and/or writing data from and to the track 28 of the disk 24.

An aspect of the present invention can be regarded as the air bearing slider 64 for use in the disk drive 10. The slider 64 includes a leading side 66 and an opposing trailing side 68. The slider 64 further includes a pair of leading side air bearing surfaces 70 disposed adjacent the leading side 66. Each of the leading side air bearing surfaces 70 includes a main portion 72 and a trailing portion 74 extending from the main portion 72 toward the trailing side 68. The slider 64 further includes a pair of side rails 76. Each of the side rails 76 is disposed between a respective one of the leading side air bearing surfaces 70 and the trailing side 68. Each of the side rails 76 includes a side rail air bearing surface 78 disposed toward the trailing side 68 and a side rail shallow recessed surface 80 extending away from the side rail air bearing surface 78 toward the respective main portion 72 and laterally along the respective trailing portion 74 in spaced relation to the respective trailing portion 74.

During operation of the disk drive 10, in order to maintain the position of the slider 64 adjacent the disk 24, the suspension 62 is configured to exert a force against the attached slider 64 towards the disk 24. Aerodynamic characteristics of the slider 64 result in air pressures which provide the slider 64 with the necessary aerodynamic lift required to fly the slider 64 at a prescribed flying height above the disk 24. As such, the relative sizing and positioning of the leading side air bearing surfaces 70 and the side rails 76 is a function of the desired aerodynamic properties associated with the same. Nonetheless, preferably the leading side air bearing surfaces 70 are configured to provide the slider 64 with a substantial portion of the aerodynamic lift requirements. Further, it is contemplated that the inclusion of the side rail air bearing surfaces 78 provides the slider 64 with improved pitch and roll aerodynamic characteristics. In this regard, the side rail air bearing surfaces 78 facilitates enhanced in-flight stability in comparison to prior art slider designs without such laterally disposed the side rail air bearing surfaces 78.

In the preferred embodiment, the slider 64 includes a main support structure 84. A leading side support base 86 extends from the main support structure 84. The leading side air bearing surfaces 70 are formed upon the leading side support base 86. In the embodiment shown, though not required, the leading side air bearing surfaces 70 are commonly formed upon the leading side support base 86. In this regard, in another arrangement, the leading side support base 86 may be a pair of structures each respectively having a leading side air bearing surface 70 formed thereon.

The trailing portions 74 of this embodiment are tapered toward trailing side 68. The trailing portions 74 may be of other geometries, such as a more rectangular configuration. In addition, while the trailing portions 74 are shown to have a width much less than that of the main portions 72, the relative width of the main portions 72 and the trailing portions 74 may be varied. As such, the transition from the main portions 72 to the trailing portions 74 may be more smooth or gradual in nature.

The slider 64 may further include a leading side shallow recessed surface 88 disposed adjacent the leading side 66 and extending between the leading side air bearing surfaces 70. In practice, the leading side air bearing surfaces 70 may extend above the leading side shallow recessed surface 88 by about 0.1 to 0.3 microns, and the leading side shallow recessed surface 88 may extend from the main support structure 84 by about 1 to 3 microns. As shown, however, for ease of discussion and depiction, it is understood that the relative heights of the leading side air bearing surfaces 70 and the leading side shallow recessed surface 88 are exaggerated in relation to the main support structure 84. Though not shown, the pair of leading side air bearing surfaces 70 disposed adjacent the leading side 66 may be integrally formed with each other and extend across the width of the slider 64. In this regard, the leading side shallow recessed surface 88 would not be disposed between the leading side air bearing surface 70, but disposed just forward of the leading side air bearing surface 70. The main portions 72 of the leading side air bearing surfaces 70 of this embodiment form a step with respect to the leading side shallow recessed surface 88. However, such abrupt transition is not required and may be of a more or less pronounced transition.

In the preferred embodiment, the slider 64 includes a pair of side rail support bases 90 which extend from the main support structure 84. The side rail air bearing surfaces 78 and the side rail shallow recessed surfaces 80 are respectively formed upon the side rail support bases 90. In practice, the side rail air bearing surfaces 78 may extend above the side rail shallow recessed surfaces 80 by about 0.1 to 0.3 microns, and the side rail shallow recessed surfaces 80 may extend from the main support structure 84 by about 1 to 3 microns. As shown, however, for ease of discussion and depiction, it is understood that the relative heights of the side rail air bearing surfaces 78 and the side rail shallow recessed surfaces 80 are exaggerated in relation to the main support structure 84. In addition, the side rail support bases 90 are preferably configured such that the side rail shallow recessed surfaces 80 are disposed laterally between the trailing portions 74 of the leading side air bearing surfaces 70. However, the side rail support bases 90 may be configured such that the trailing portions 74 of the leading side air bearing surfaces 70 are disposed laterally between the side rail shallow recessed surfaces 80.

The side rail shallow recessed surfaces 80 of this embodiment are tapered toward the leading side 66. The side rail shallow recessed surfaces 80 may be of other geometries, such as a more rectangular configuration. In addition, while the side rail shallow recessed surfaces 80 are shown to gradually taper in width respectively from the side rail air bearing surfaces 78, the relative transition with respect to lateral width may be of a more abrupt nature. Moreover, the side rail air bearing surfaces 78 are shown to form a step with respect to the side rail shallow recessed surfaces 80. However, such abrupt transition is not required and may be of a more or less pronounced transition.

The slider 64 may further include a deep recessed surface 102 disposed between the leading and trailing sides. In this regard, a cavity 104 is formed in the region above the deep recessed surface 102 relative to the leading side air bearing surfaces 70 and the side rails 76. In the embodiment shown, the deep recessed surface 102 extends between the side rails 76. Further, the deep recessed surface 102 extends between the main portions 72 and the trailing side 68, as well as laterally between the two main portions 72 with respect to each other.

As the side rail shallow recessed surface 80 is disposed in spaced relation to the respective trailing portion 74, a gap 82 is disposed between the side rail shallow recessed surface 80 and the respective trailing portion 74. As the side rail shallow recessed surface 80 is disposed laterally along the respective trailing portion 74, it is understood that only a portion of the side rail shallow recessed surface 80 and a portion of the respective trailing portion 74 need be disposed along each other (i.e., some degree of lateral overlap). Further, due to the geometry of the side rail shallow recessed surface 80 and the respective trailing portion 74, the gap 82 may be disposed at varying angular orientations. In the embodiment shown the gap 82 extends at an angle of about thirty degrees with respect to a longitudinal axis between the leading and trailing sides 66, 68. Additionally, due to the geometry of the side rail shallow recessed surface 80 and the respective trailing portion 74, the gap 82 may be formed to have a constant width as shown or may have other configurations such as being tapered. In addition, the relative depth of the gap 82 may vary. In the embodiment shown, the deep recessed surface 102 extends between the side rail shallow recessed surfaces 80 and the trailing portions 74. As such, though not required, the gap 82 may extend vertically downward all the way to the deep recessed surface 102.

Figure 5:
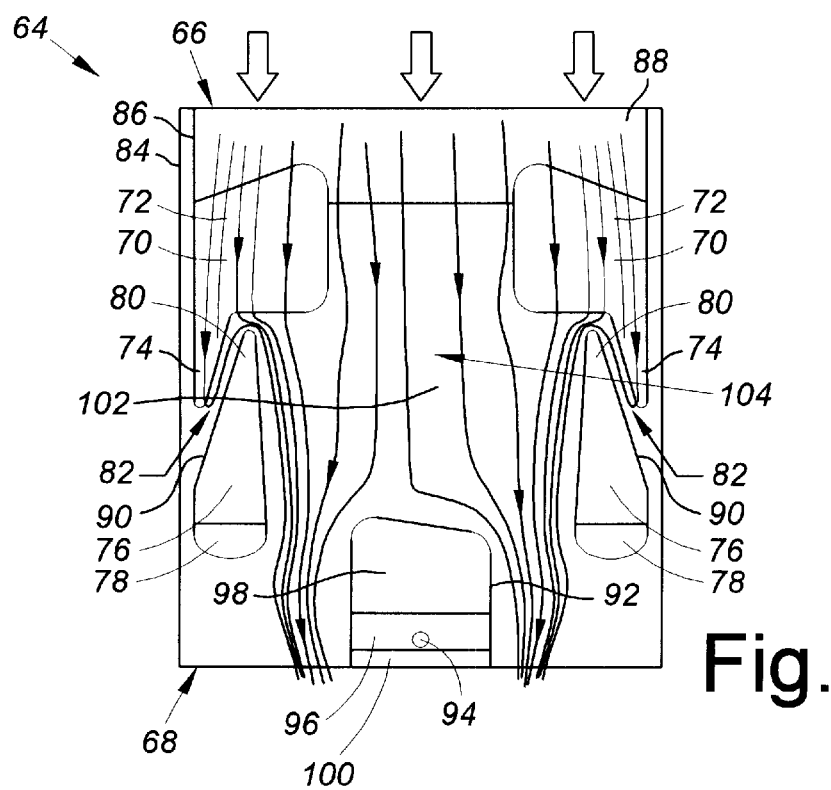
FIG. 5 is the plan view of the air bearing slider of FIG. 4 as shown with exemplary air flow lines.

Referring now to FIG. 5, there is depicted the plan view of the air bearing slider 64 of FIG. 4 as shown with exemplary air flow lines. Advantageously, it is contemplated that the overlapping nature of the trailing portions 74 and the side rail shallow recessed surface 80 results in an air flow pattern immediately downstream of the main portions 72 which tends to mitigate the accumulation of debris at such locations. The overlapping trailing portions 74 and the side rail shallow recessed surfaces 80 facilitate maintaining a desired region of air expansion within the cavity 104. The formation of the gaps 82 between the trailing portions 74 and the side rail shallow recessed surfaces 80 allows for a discontinuity of the surface geometry of the slider 64 immediately downstream of the main portions 72 to discourage debris accumulation.

The slider 64 may further include a trailing side pad 92 including a transducer 94 disposed adjacent the trailing side. The trailing side pad 92 includes a trailing side air bearing surface 96 disposed adjacent the trailing side 68. The trailing side pad 92 may further include a first trailing side shallow recessed surface 98 extending towards the leading side 66 from the trailing side air bearing surface 92, and a second trailing side shallow recessed surface 100 extending towards the trailing side 68 from the trailing side air bearing surface 92. In practice, the trailing side air bearing surface 96 may extend above the first and second trailing side shallow recessed surfaces 98, 100 by about 0.1 to 0.3 microns, and the first and second trailing side shallow recessed surfaces 98, 100 may extend from the main support structure 84 by about 1 to 3 microns. As shown, however, for ease of discussion and depiction, it is understood that the relative heights of the leading side air bearing surfaces 70 and the leading side shallow recessed surface 88 are exaggerated in relation to the main support structure 84.

I claim:

1. An air bearing slider for use in a disk drive, the slider comprising:
   a leading side and an opposing trailing side;
   a pair of leading side air bearing surfaces disposed adjacent the leading side, each leading side air bearing surface including:
   a main portion; and
   a trailing portion extending from the main portion toward the trailing side; and
   a pair of side rails, each side rail being disposed between a respective one of the leading side air bearing surfaces and the trailing side and including;
   a side rail air bearing surface disposed toward the trailing side; and
   a side rail shallow recessed surface extending away from the side rail air bearing surface toward the respective main portion and laterally along the respective trailing portion in spaced relation to the respective trailing portion.

2. The slider of claim 1 wherein the side rail shallow recessed surfaces are disposed laterally between the trailing portions.

3. The slider of claim 1 wherein the trailing portions are tapered toward the trailing side.

4. The slider of claim 1 wherein the side rail shallow recessed surfaces are tapered toward the leading side.

5. The slider of claim 1 further includes a deep recessed surface disposed between the leading and trailing sides.

6. The slider of claim 5 wherein the deep recessed surface extends between the side rails.

7. The slider of claim 5 wherein the deep recessed surface extends between the main portions and the trailing side.

8. The slider of claim 5 wherein the deep recessed surface extends between the main portions.

9. The slider of claim 5 wherein the deep recessed surface extends between the side rail shallow recessed surfaces and the trailing portions.

10. The slider of claim 1 further includes a leading side shallow recessed surface disposed adjacent the leading side and extending between the leading side air bearing surfaces.

11. The slider of claim 1 further includes a trailing side pad including a transducer disposed adjacent the trailing side.

12. The slider of claim 11 wherein the trailing side pad includes a trailing side air bearing surface disposed adjacent the trailing side.

13. The slider of claim 12 wherein the trailing side pad includes a trailing side shallow recessed surface extending towards the leading side from the trailing side air bearing surface.

* * * * *